(12) United States Patent
Mahyar et al.

(10) Patent No.: US 11,216,684 B1
(45) Date of Patent: Jan. 4, 2022

(54) DETECTION AND REPLACEMENT OF BURNED-IN SUBTITLES

(71) Applicant: Amazon Technologies, Inc., Seattle, WA (US)

(72) Inventors: Hooman Mahyar, Kirkland, WA (US); Vimal Bhat, Redmond, WA (US); Harshal Dilip Wanjari, Issaquah, WA (US); Sushanta Das, Kirkland, WA (US); Neha Aggarwal, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 16/781,456

(22) Filed: Feb. 4, 2020

(51) Int. Cl.
*G06K 9/32* (2006.01)
*G06K 9/00* (2006.01)
*G06T 7/11* (2017.01)
*G06T 5/00* (2006.01)

(52) U.S. Cl.
CPC ....... *G06K 9/3266* (2013.01); *G06K 9/00718* (2013.01); *G06K 9/00765* (2013.01); *G06T 5/005* (2013.01); *G06T 7/11* (2017.01); *G06K 2209/01* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2009/0214078 | A1* | 8/2009 | Kuo | H04N 5/44504 382/103 |
| 2010/0260467 | A1* | 10/2010 | Tsai | G11B 27/034 386/278 |
| 2012/0249879 | A1* | 10/2012 | Yuan | G11B 27/034 348/577 |
| 2014/0118621 | A1* | 5/2014 | Liu | H04N 5/445 348/564 |
| 2020/0349381 | A1* | 11/2020 | Wang | G06K 9/344 |

FOREIGN PATENT DOCUMENTS

CN 110660033 A * 1/2020

* cited by examiner

*Primary Examiner* — Justin P. Misleh
(74) *Attorney, Agent, or Firm* — Weaver Austin Villeneuve & Sampson LLP

(57) ABSTRACT

Techniques are described for detecting and replacing burned-in subtitles in image and video content.

14 Claims, 4 Drawing Sheets

FIG. 4

DETECTION AND REPLACEMENT OF BURNED-IN SUBTITLES

BACKGROUND

Image and video content often includes burned-in subtitles, e.g., subtitles delivered not as a text file but as an integral part of the image or video content. For a content delivery service, the presence of burned-in subtitles can be problematic, especially when a copy of the original content without burned-in subtitles is not readily available. In particular, a content delivery service delivering content with burned-in subtitles is conventionally unable to remove burned-in subtitles, which presents challenges for delivering content to users who prefer subtitle-free content and challenges for delivering content with subtitles in a language other than the language of the burned-in subtitles.

BRIEF DESCRIPTION OF THE DRAWINGS

FIG. 4 illustrates examples of first content having burned-in subtitles and second content having non-subtitle content.

DETAILED DESCRIPTION

Figure 1:
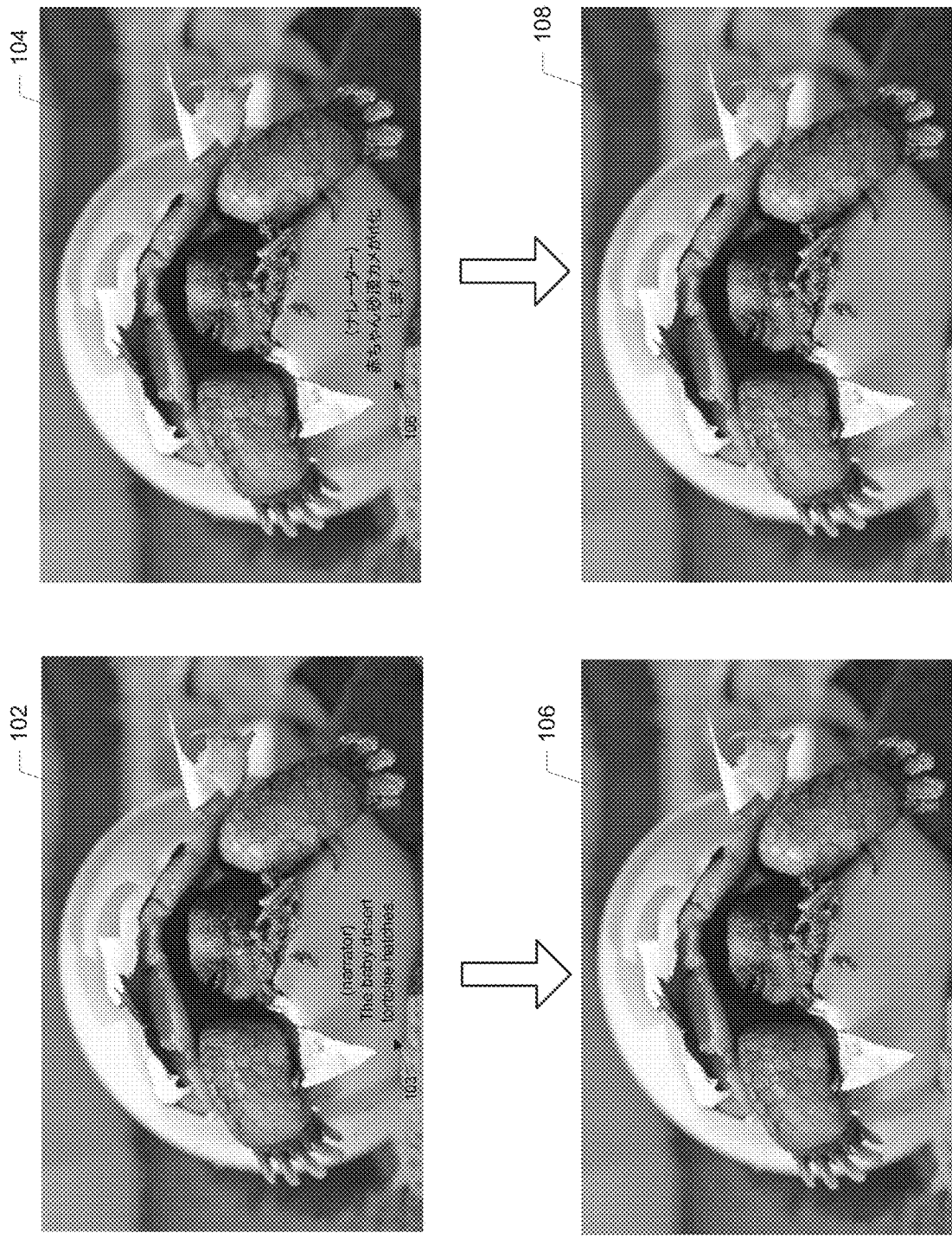
FIG. 1 illustrates an example of removing pixels associated with burned-in subtitles from image and/or video content and filling in removed pixels.

This disclosure describes techniques for detecting and removing pixels associated with burned-in subtitles from image and video content. This disclosure also describes techniques for replacing removed pixels based on the original image and video content and/or based on other versions of the image and video content. This may be understood with reference to the example shown in FIG. 1 which depicts the removal and replacement of pixels associated with burned-in subtitles from image or video content.

The depicted example shows two versions of video content having burned-in subtitles. Frame 102 has an English-language burned-in subtitles 103, while frame 104 has a Japanese-language burned-in subtitles 105. Subtitles 103 and 105, being burned-in subtitles, form part of the image itself, as opposed to non-burned-in subtitles which are dynamically inserted during playback. As non-limiting examples, images and video with burned-in subtitles can include images and video in which content-pixels are removed and replaced with subtitle-pixels and can include images and video in which subtitle-pixels overlay or over-write content-pixels (e.g., without "removing" the original content-pixels). In instances where a content delivery service does not already possess a version of the content (e.g., frame 102 or 104) free of burned-in subtitles, the content delivery service may be unable to deliver the content without subtitles, or with subtitles in a language other the language(s) of burned-in subtitles.

According to a particular class of implementations, the burned-in subtitles (e.g., subtitles 103 and/or subtitles 105) may be removed by determining which pixels are associated with burned-in subtitles and replacing image information (e.g., color and brightness) for those pixels with an approximation of the missing, original image information (e.g., the image information that would be present in a version of the content lacking burned-in subtitles, if such a version were available). The result of this process is illustrated by example frames 106 and 108. In frames 106 and 108, pixels that were formerly associated with burned-in subtitles (103 and 105, respectively) can be filled in with approximations of the missing, original image content, such that the frames 106 and 108 appear to have never had subtitles burned-in. As will be appreciated, a content service can realize significant benefits by removing burned-in subtitles. As examples, a content service may be able to distribute the content free of subtitles and/or distribute the content with subtitles (burned-in or not) in a language different than the language of the originally burned-in subtitles.

Figure 2:
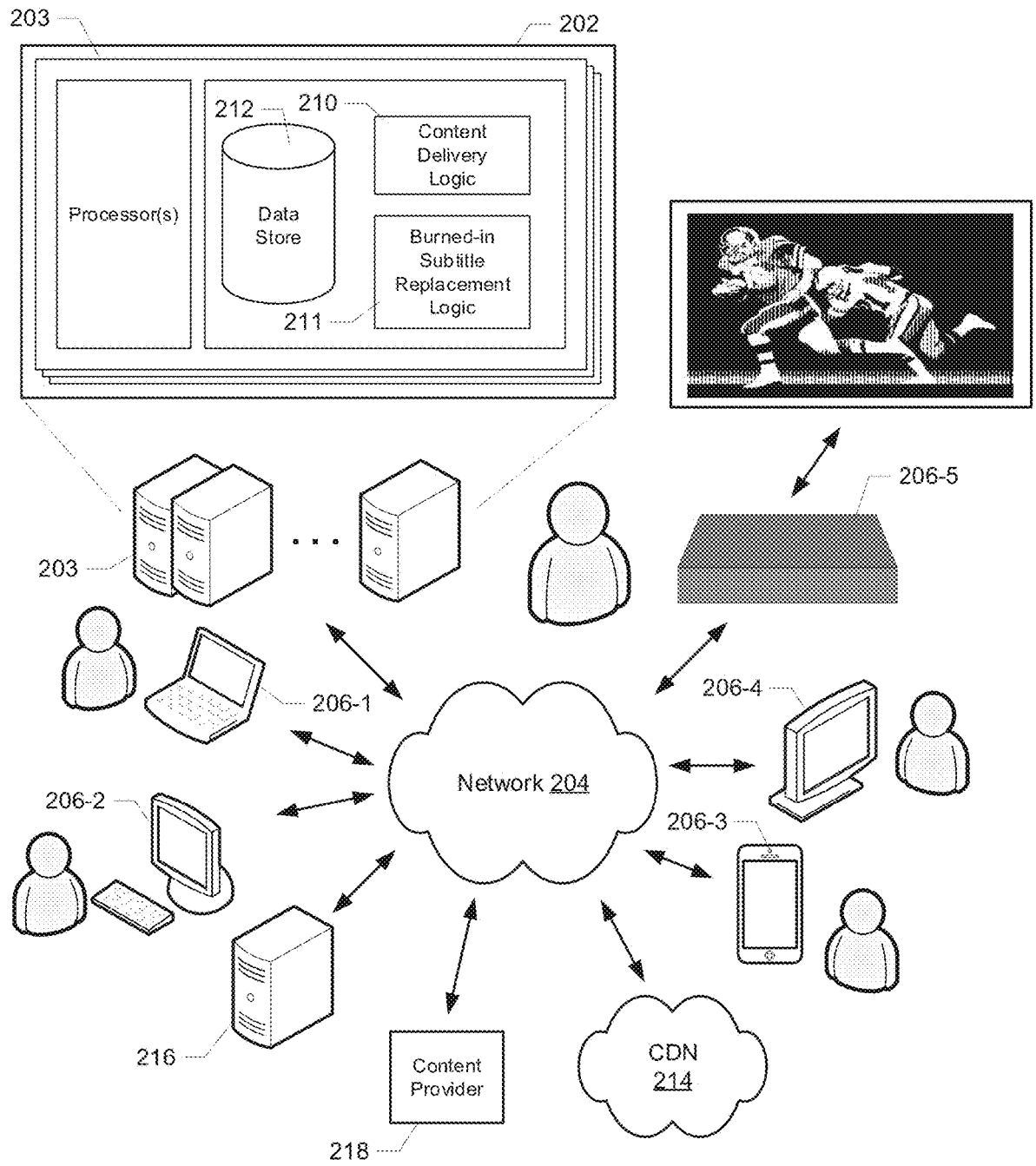
FIG. 2 illustrates an example of a computing environment in which implementations enabled by the present disclosure may be practiced.

FIG. 2 illustrates an example of a computing environment in which a video content service 202 provides video content via network 204 to a variety of client devices (206-1 through 206-5) in accordance with the techniques described herein. The video content may include live or broadcast content or video-on-demand (VOD) content. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both broadcast content and VOD-style content to client devices. However, it will be understood that content service 202 may provide access to content in conjunction with one or more content delivery networks (e.g., CDN 214) that may or may not be independent of content service 202. In addition, the source(s) of one or both of the broadcast and VOD-style content may or may not be independent of content service 202 (e.g., as represented by content provider server 216, and live content provider 218). The range of variations known to those of skill in the art are contemplated to be within the scope of this disclosure.

Some of the implementations enabled by the present disclosure contemplate logic resident on the client devices consuming video content from content service 202; such logic might be configured to handle, for example, requesting smaller chunks of subtitle files. Such client devices and such logic may be used in overlaying subtitles on video content (e.g., displaying subtitles overlaid on image frames from which burned-in subtitles were previously removed using one or more of the techniques disclosed herein). Such logic might be part of an existing algorithm or module on the client device or implemented to work in conjunction with such an algorithm or module.

It should also be noted that implementations are contemplated in which, in addition to content delivery logic 210 (which facilitates various aspects of content delivery to client devices 206), content service 202 may include other types of logic, e.g., burned-in subtitle removal logic 211 that facilitates the detection and removal of burned-in subtitles (e.g., the replacement of burned-in subtitles with an approximation of the missing original content under the burned-in subtitles).

In addition to providing access to video content, content service 202 may also include a variety of information related to the video content (e.g., non-burned-in subtitle information, and other associated metadata and manifests in data store 212 to which service 202 provides access). Alternatively, such information associated with and/or about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
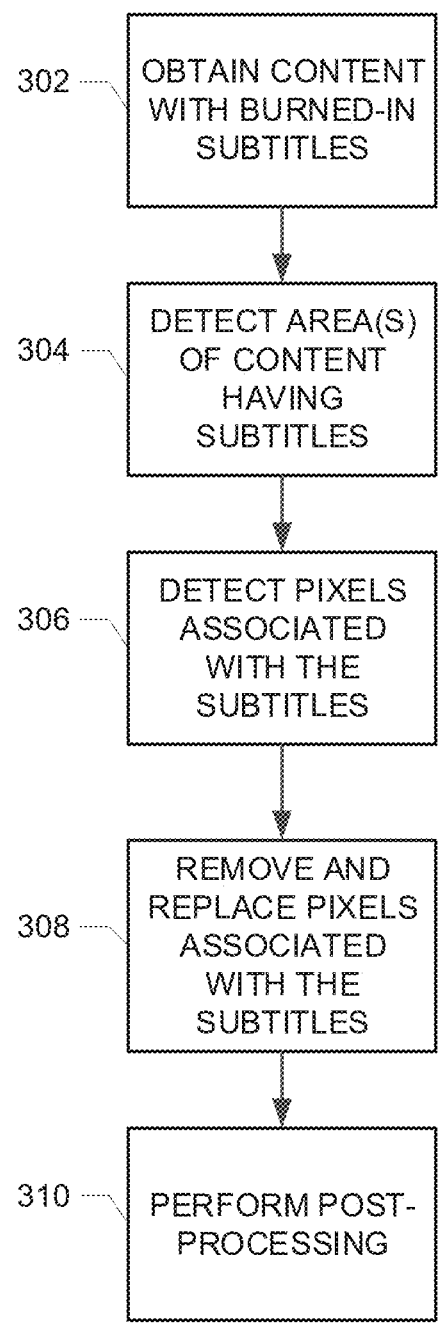
FIG. 3 is a flowchart illustrating operation of a particular class of implementations enabled by the present disclosure.

FIG. 3 illustrates a flowchart for detecting and replacing burned-in subtitles, e.g., removing pixels associated with burned-in subtitles from image and/or video content and filling in removed pixels.

In a class of implementations, detecting and placing burned-in subtitles includes, at step 302, obtaining content having burned-in subtitles. The content may be obtained from a video-on-demand library, an ongoing broadcast, a recording of an earlier broadcast, or another content source. While many of the examples discussed herein are in the context of subtitles, the techniques disclosed herein may be used in detecting and replacing other elements including objects such as guns and cigarettes.

In some implementations, at step 304, the content obtained in step 302 is analyzed to detect one or more areas having burned-in subtitles. As an example, step 304 may involve analyzing one or more image frames, such as frames 402 and 406 of FIG. 4, to detect regions or areas containing text, such as regions 404 and 408. Regions containing text may be identified using automatic, semi-automatic, or manual techniques.

Step 304 may, in some implementations, additionally involve analyzing the regions 404 and 408 containing text to distinguish between subtitle text as in region 404 and non-subtitle text as in region 408. Non-subtitle text may include text written on objects within the frame as well as floating text (i.e., text not written on an object) such as a title, credits, time and/or place indications, or other text not associated with spoken dialogue or other auditory information. Discriminating between subtitle text and non-subtitle text may be accomplished using automatic, semi-automatic, or manual techniques. Common differences between subtitle text and non-subtitle text such as position, color, and font size may be used in discriminating between subtitle and non-subtitle text. Additionally, additional cues such as the contemporaneous presence of spoken dialogue may be used as a cue in discriminating between subtitle text and non-subtitle text. Such cues may be utilized by a neural network, in some implementations.

In a class of implementations, a neural network trained to identify burned-in subtitles may be used to detect areas of content having subtitles in step 304. As examples, an R-CNN, fast R-CNN, and/or faster R-CNN object detection algorithm trained to detect burned-in subtitles may be used to detect areas of content having subtitles in step 304. A neural network may be trained with content that lacks burned-in subtitles but for which subtitle information is known (e.g., text-based subtitles that are only optionally overlaid on the content). In such an example, the subtitles can be burned into the source content while tracking which pixels of the content are transformed into subtitle pixels. The neural network can then be trained using the content with newly burned-in subtitles, as the subtitle pixels are already known and are usable to verify and improve or optimize training results until a neural network with adequate performance is achieved.

In some implementations, a trained neural network may be configured to identify what areas of the content contain text (e.g., an identification of areas 404 and 408) and provide a confidence score indicative of the network's confidence that the text within the identified area(s) is subtitle-text rather than non-subtitle text. In some implementations, it may be desirable to only remove text for which there is a sufficiently high confidence that the text is a subtitle (e.g., to avoid removing non-subtitle text such as titles, place names, or even text on objects such as in the example of frame 406). In particular, only text having a subtitle confidence score above a threshold may be removed. As examples, a minimum subtitle confidence score of at least 75%, at least 80%, at least 85%, at least 90%, or at least 95% may be required in order for a given area of text to be identified or detected as subtitle text for removal.

In some implementations, at step 306, an analysis may be performed to identify or detect pixels that are associated with subtitles (e.g., to discriminate between the pixels actually associated with subtitles within area 404 and content pixels such as those associated with the eggshell). In various implementations, step 306 is performed after step 304, in that the analysis identifying pixels associated with subtitles is performed only on area(s) determined to have subtitle content in step 304. In other implementations, step 306 may be performed concurrently with step 304, in that the analysis of step 304 may itself include identification of the specific pixels associated with subtitles. If desired, step 304 is accomplished using a first neural network (e.g., a neural network trained, as discussed above, to identify regions containing subtitles and an associated confidence score) while step 306 is accomplished using a second neural network (e.g., a neural network trained to discriminate between subtitle pixels and non-subtitle pixels). A neural network configured to perform step 306 may be trained in a manner similar to that discussed above in connection with step 304. In particular, a neural network configured to perform step 306 may be trained with training content created by burning-in subtitles at known pixel positions. With such training content, trial results (e.g., results from trial networks being tested in neural network training operations) can judged based on their ability to accurately identify which pixels are associated with subtitles. If desired, a neural network configured to perform step 306 may provide, as outputs, identifications of the coordinates of pixels associated with subtitles and, if desired, one or more confidence scores for one or more pixels, where the confidence score indicates a likelihood that the pixel or a group of pixels are associated with a subtitle. In some implementations, only pixels having a sufficiently high confidence score—such as a confidence score of at least 80%, at least 85%, at least 90%, or at least 95%—are identified as subtitle-pixels in step 306.

In some embodiments, identifying pixels associated with burned-in subtitles (including discriminating between subtitle-text and non-subtitle text) may involve analyzing accompanying audio content (i.e., an accompanying audio track). As an example, steps 304 and/or 306 may include processing audio content accompanying the video content through a speech recognition algorithm or the like (e.g., to identify words and phrases spoken by characters or narrators), processing the video content through an optical character recognition (OCR) algorithm or the like (e.g., to identify text within the video content, including subtitle-text and non-subtitle text), and then comparing the results of the speech recognition algorithm and the OCR algorithm to discriminate between subtitle-text and non-subtitle text. In particular, if there are sufficiently close similarities between the text output by the speech recognition algorithm and the text from the OCR algorithm, it may be determined that the text is subtitle-text as opposed to non-subtitle text. In general, it may be desirable to allow for variation between the results of the speech recognition algorithm and the OCR algorithm, as subtitles do no always match the spoken words exactly and such algorithms may introduce minor errors. Such an approach may even be applied when the audio content is in a language other than the burned-in subtitles, by further translating the text from the OCR algorithm and/or translating the text from the speech recognition algorithm such that the two texts are in the same language. Again, it may be desirable to allow for variation between the results, as translation may introduce additional minor errors.

In various implementations, at step 308, pixels that have been identified as being subtitle-pixels may be removed from the content and replaced with an approximation of the content-pixels previously covered by the subtitle-pixels. Replacing the subtitle-pixels with an approximation of the content-pixels may involve interpolation based on adjacent content-pixels. For example and in reference to the example of frame 402, replacing the subtitle-pixels in region 404 may involve determining pixel values (e.g., color and brightness) for each former subtitle-pixel based on nearby and/or adjacent content-pixels. In some embodiments, only pixels within the area containing burned-in subtitles (e.g., inside area 404 of frame 402) are utilized in determining approximations of the former subtitle pixels. In other embodiments, pixels outside the area containing burned-in subtitles (e.g., outside area 404 of frame 402) are also utilized in determining approximations of the former subtitle pixels. Any desired interpolation algorithm may be used including, but not limited to, nearest neighbor(s), bilinear, bicubic, spline, sinc, lanczos, and an adaptive algorithm (e.g., algorithms that vary depending on the image content, such as applying a different version of the algorithm upon detection of an edge in the content). If desired, a neural network may be trained and/or utilized in replacing the subtitle-pixels with an approximation of the missing (e.g., burned over) content-pixels.

In some instances, multiple versions of a given piece of content (e.g., a particular movie or motion picture, an episode of a television show or miniseries, a short film, an animation, or some other video or image content) having burned-in subtitles of different languages may be available. In such instances, the two versions of content can be jointly utilized to obtain a version free of burned-in subtitles. For example, the first version may have burned-in subtitles in a first language, where those subtitles cover pixels A, B, and C of a given frame; while the second version may have burned-in subtitles in a second language, where those subtitles cover pixels A, B, and D. In such a scenario, steps 306 and/or 308 may involve comparing the two versions, matching frames between the two versions, and identifying pixels that contain original content in at least one version (e.g., pixels C and D in the present example). Thus, the color and brightness of pixel D in the first version of the content and the color of brightness of pixel C in the second version of the content may be used to fill in content-pixels in the final version free of burned-in subtitles. Pixels that are covered by a burned-in subtitle in all available versions of the content (e.g., pixels A and B) may continue to be replaced using the approximation techniques described above.

In still other embodiments, content-pixels for a given frame may be derived from content-pixels in one or more frames that are adjacent-in-time to the given frame. In particular, since burned-in subtitles often remain stationary while content moves underneath the subtitles, it is possible to determine the original content of a burned-in pixel from the content of preceding or subsequent frames. This might be done, for example, using motion prediction techniques similar to those used in the encoding of content according to video codecs such as Advanced Video Coding (AVC or H.264) or High-Efficiency Video Coding (HEVC or H.265).

In various implementations, at step 310, post-processing may be performed at least on frames that have had burned-in subtitle pixels replaced with approximations or recovered versions of original-content pixels. The post-processing of step 310 may seek to reduce or eliminate any image artifacts that arise from the removal of burned-in subtitles and the replacement thereof with approximations of the original content. As an example, an anti-aliasing may be applied to reduce or eliminate the appearance of jagged diagonal edges. As another example, sharpness, contrast, brightness, and other image properties may be adjusted to reduce or eliminate any remaining artifacts and achieve a more realistic result (e.g., reduce the likelihood that a user could perceive that burned-in subtitles were originally present).

It should further be appreciated that the disclosed techniques are compatible with both live and on demand applications, and are applicable to video, audio, and other forms of media content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method for detecting and removing burned-in subtitles from video content, comprising:
   obtaining a video, wherein the video comprises a motion picture or an episode of a television series, wherein the video includes an image frame having burned-in subtitles, and wherein the video has an accompanying audio track;
   detecting, within the image frame, an area of the image frame that bounds the burned-in subtitles;
   detecting, within the area of the image frame that bounds the burned-in subtitles, first pixels associated with the burned-in subtitles, wherein the subtitles were burned-into the image frame by removing second pixels associated with non-subtitle image content and inserting, in place of the second pixels, the first pixels associated with the burned-in subtitles, wherein detecting the first pixels includes:
      processing at least a portion of the audio track through a speech recognition algorithm;
      processing at least a portion of the image frame through an optical character recognition algorithm; and
      determining, based on a comparison of outputs of the speech recognition and optical character recognition algorithms, that the image frame contains subtitle text;
   determining, based at least on third pixels in the image frame associated with non-subtitle image content, approximations of the second pixels associated with non-subtitle image content; and
   outputting a version of the video in which the first pixels of the image frame have been replaced based on the approximations of the second pixels.

2. The method of claim 1, wherein determining the approximations of the second pixels comprises performing interpolations based on the at least some of the third pixels.

3. The method of claim 1, wherein a fraction of the third pixels lie within the detected area that bounds the burned-in subtitles and wherein determining the approximations of the second pixels comprises performing interpolations based the fraction of the third pixels that lie within the detected area.

4. The method of claim 1, wherein detecting the area of the image frame that bounds the burned-in subtitles comprises calculating a confidence score indicative of the likelihood that the area includes subtitle-text instead of non-subtitle text and determining that the confidence score exceeds a threshold.

5. A method for removing burned-in subtitles from video content, comprising:
   obtaining a video, wherein the video includes an image frame having burned-in subtitles, and wherein the video has an accompanying audio track;
   detecting, within the image frame, first pixels associated with the burned-in subtitles wherein detecting the first pixels includes:
      processing at least a portion of the audio track through a speech recognition algorithm;
      processing at least a portion of the image frame through an optical character recognition algorithm; and
      determining, based on a comparison of outputs of the speech recognition and optical character recognition algorithms, that the image frame contains subtitle text;
   determining replacement pixels for the first pixels; and
   outputting a version of the video in which the first pixels of the image frame are replaced with the replacement pixels.

6. The method of claim 5, wherein determining the replacement pixels comprises interpolation based at least on second pixels in the image frame.

7. The method of claim 5, wherein the image frame comprises a first image frame, wherein the video includes a second image frame that precedes or follows the first image frame, and wherein determining the replacement pixels comprises analyzing image content in the first image frame.

8. The method of claim 5, further comprising calculating a confidence score indicative of the likelihood that an area of the image frame corresponding to the first pixels includes subtitle-text instead of non-subtitle text and determining that the confidence score exceeds a threshold.

9. The method of claim 5, wherein detecting the first pixels associated with the burned-in subtitles comprises processing the image frame through a neural network configured to detect burned-in subtitles.

10. A system, comprising
    one or more processors and memory configured to:
       obtain a video, wherein the video includes an image frame having burned-in subtitles, and wherein the video has an accompanying audio track;
       detect, within the image frame, first pixels associated with the burned-in subtitles wherein the one or more processors and memory are configured to detect the first pixels by:
          processing at least a portion of the audio track through a speech recognition algorithm;
          processing at least a portion of the image frame through an optical character recognition algorithm; and
          determining, based on a comparison of outputs of the speech recognition and optical character recognition algorithms, that the image frame contains subtitle text;
       determine replacement pixels for the first pixels; and
       output a version of the video in which the first pixels of the image frame are replaced with the replacement pixels.

11. The system of claim 10, wherein the processors and memory are configured to determine the replacement pixels by interpolation based at least on second pixels in the image frame.

12. The system of claim 10, wherein the image frame comprises a first image frame, wherein the video includes a second image frame that precedes or follows the first image frame, and wherein the processors and memory are configured to determine the replacement pixels by analyzing image content in the first image frame.

13. The system of claim 10, wherein the processors and memory are further configured to calculate a confidence score indicative of the likelihood that an area of the image frame corresponding to the first pixels includes subtitle-text instead of non-subtitle text and determining that the confidence score exceeds a threshold.

14. The system of claim 10, wherein the processors and memory are configured to detect the first pixels associated with the burned-in subtitles by processing the image frame through a neural network configured to detect burned-in subtitles.

\* \* \* \* \*